(12) United States Patent
Grigera

(10) Patent No.: US 11,868,451 B2
(45) Date of Patent: Jan. 9, 2024

(54) ON-DEMAND APPLICATION PERMISSIONS

(71) Applicant: Google LLC, Mountain View, CA (US)

(72) Inventor: Alejo Grigera, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/643,431

(22) Filed: Dec. 9, 2021

(65) Prior Publication Data

US 2022/0100826 A1 Mar. 31, 2022

Related U.S. Application Data

(63) Continuation of application No. 16/835,151, filed on Mar. 30, 2020, now Pat. No. 11,216,537, which is a continuation of application No. 15/919,006, filed on Mar. 12, 2018, now Pat. No. 10,628,563, which is a continuation of application No. 14/267,793, filed on May 1, 2014, now Pat. No. 9,946,856.

(51) Int. Cl.
*G06F 21/30* (2013.01)
*G06F 21/62* (2013.01)

(52) U.S. Cl.
CPC .......... *G06F 21/30* (2013.01); *G06F 21/629* (2013.01); *G06F 21/6245* (2013.01)

(58) Field of Classification Search
CPC ..... G06F 21/30; G06F 21/629; G06F 21/6245
See application file for complete search history.

(56) References Cited

U.S. PATENT DOCUMENTS

| | | | |
|---|---|---|---|
| 8,255,991 B1 | 8/2012 | Hackborn et al. | |
| 8,265,595 B1 | 9/2012 | Reeves et al. | |
| 8,332,936 B1 | 12/2012 | Hackborn et al. | |
| 8,595,489 B1 | 11/2013 | Faaborg et al. | |
| 8,601,539 B1 | 12/2013 | Bobel | |
| 8,656,465 B1 | 2/2014 | Fong-Jones | |
| 8,824,372 B2* | 9/2014 | Hoggan | H04L 63/107 370/328 |
| 2012/0151557 A1 | 6/2012 | Ahmed et al. | |
| 2012/0311697 A1* | 12/2012 | Swingler | G06F 21/604 726/17 |

(Continued)

OTHER PUBLICATIONS

Permission Friendly Apps, androidsofl.org, [online] [retrieved on Mar. 31, 2014] URL: <http://www.androidsofl.org/> ermission-friendly-apps.hl ml, 1 pg.

*Primary Examiner* — Amie C. Lin
(74) *Attorney, Agent, or Firm* — Honigman LLP; Brett A. Krueger

(57) ABSTRACT

On-demand application permissions is described, including obtaining one or more consents associated with one or more functions of an application, where the application does not allow using the functions without associated consents; receiving, from a user, a consent associated with a function; activating to allow that function to be executed; when a request from the user to use another function is received, determining that the another function requires an associated consent to activate; determining that there is no consent from the user associated with the another function; prompting for a consent associated with the another function; receiving the consent associated with another function; and activating to allow the another function to be executed.

18 Claims, 11 Drawing Sheets

(56) References Cited

U.S. PATENT DOCUMENTS

| | | | |
|---|---|---|---|
| 2012/0317565 A1* | 12/2012 | Carrara | G06F 21/54 |
| | | | 717/178 |
| 2013/0055411 A1 | 2/2013 | Yang et al. | |
| 2013/0067531 A1* | 3/2013 | Morris | G06F 21/54 |
| | | | 726/16 |
| 2013/0097517 A1 | 4/2013 | Reiss et al. | |
| 2013/0097652 A1* | 4/2013 | Bhattacharjee | H04L 63/0227 |
| | | | 726/1 |
| 2013/0347096 A1 | 12/2013 | Lee | |
| 2014/0181935 A1 | 6/2014 | Beckmann et al. | |

\* cited by examiner

ON-DEMAND APPLICATION PERMISSIONS

CROSS REFERENCE TO RELATED APPLICATIONS

This U.S. patent application is a continuation of, and claims priority under 35 U.S.C. § 120 from, U.S. patent application Ser. No. 16/835,151, filed on Mar. 30, 2020, which is a continuation of U.S. patent application Ser. No. 15/919,006, filed on Mar. 12, 2018, now U.S. Pat. No. 10,628,563, which is a continuation of U.S. patent application Ser. No. 14/267,793, filed on May 1, 2014, now U.S. Pat. No. 9,946,856. The disclosures of these prior applications are considered part of the disclosure of this application and are hereby incorporated by reference in their entireties.

TECHNICAL FIELD

The subject matter discussed herein relates generally to software applications and, more particularly, to on-demand application permissions.

BACKGROUND

A related art software application (also referred to as an "app") often requires access to data about a user of the app, such as the user's personal information (e.g., name, phone number, location, profile info, etc.) and/or access certain features of a host device (e.g., cameras, microphone, networking communication capabilities, etc.).

When a user installs an app according to the related art scheme, the user is asked to provide permissions to access or use the user's information and/or certain features of a host device. For example, the user may be asked to grant access to "your camera," "your contacts list," "your storage media," "your microphone," and other information and/or features that the app may access at some point, regardless of how the user will use the app.

SUMMARY

The subject matter includes methods for implementing on-demand application permissions, including obtaining one or more consents associated with one or more functions of an application, where the application does not allow using the functions without associated consents; receiving, from a user, a consent associated with a function; activating to allow that function to be executed; when a request from the user to use another function is received, determining that the another function requires an associated consent to activate; determining that there is no consent from the user associated with the another function; prompting for a consent associated with the another function; receiving the consent associated with another function; and activating to allow the another function to be executed.

The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing on-demand application permissions.

A software application (app) may access or use sensitive information (e.g., a user's personal information) and/or components of a host device (e.g., the device on which the application is running). For example, an app may access a camera of a host device to take images and/or videos, as well as send emails to the user of the application using the user's email address. The app may ask the user for permissions or consents to use or access the user's email address, the device's camera, and other information and/or components, depending on implementation.

However, not all permissions are required up-front (e.g., at the time of installation) to use the application. For example, access to a camera is only necessary if the user intends to take photos and/or videos. If the user only wants to use the app to browse or view available photos (e.g., those of the user's friends), the camera of the user's device is not involved, and permission to use that camera is not required. Similarly, a permission to use the host device's microphone or to record audio is only necessary if the user intends to record audio.

On-demand application permissions provide users with the choice of which permissions to grand, defer, and/or decline on an as-needed basis.

Figure 1A:
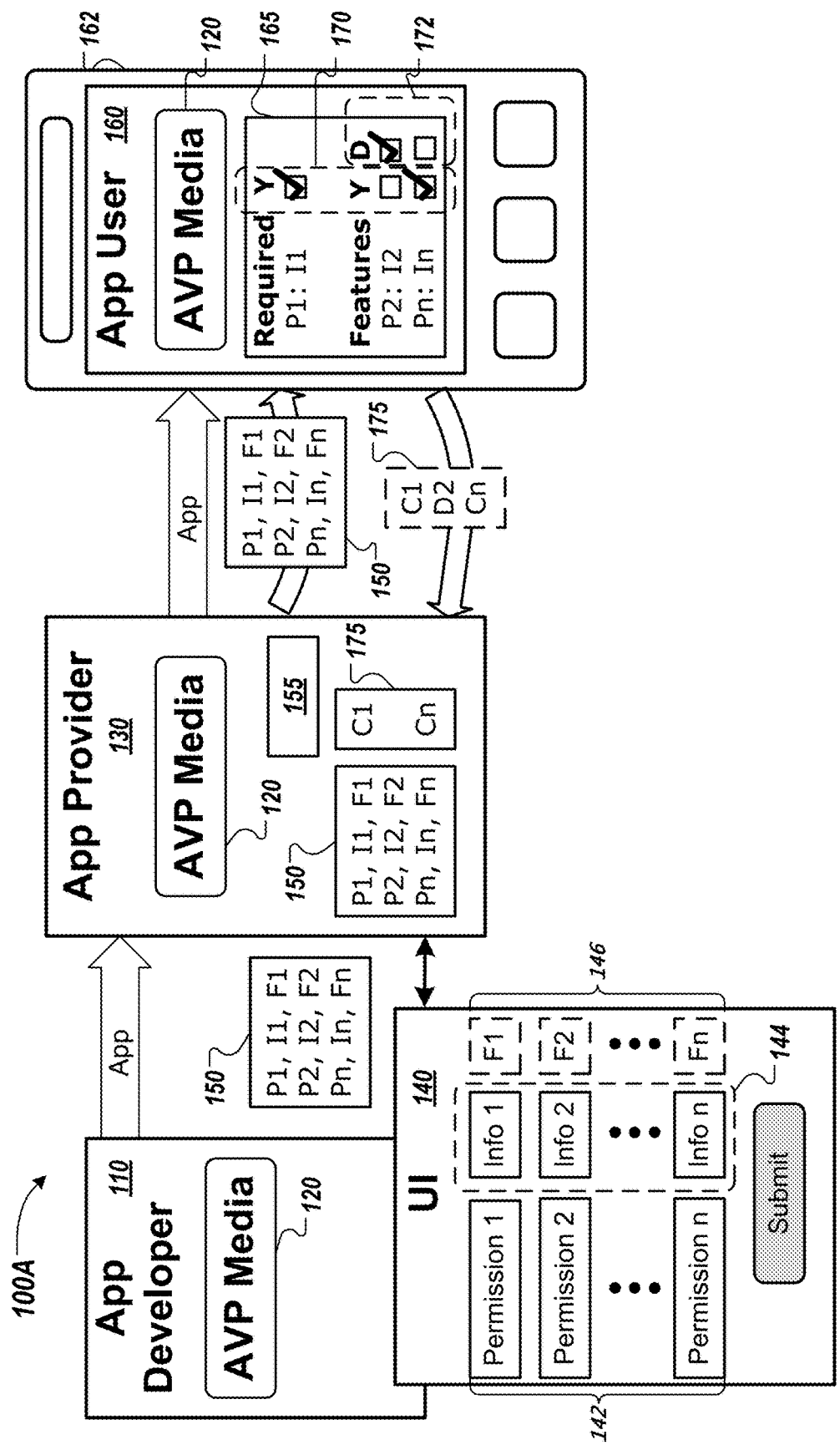
FIG. 1A shows an example environment where an application may be provided according to some example implementations.

FIG. 1A shows an example environment where an application may be provided according to some example implementations. Environment 100A includes at least one application developer 110 who develops, provides, or otherwise publishes or releases an application (e.g., app 120, entitled "AVP Media" for example) to app users 160. In environment 100A, applications may be released through an intermediary, such as an application distributor, a website, a software repository, or an application store (e.g., an app provider 130), from which one or more app users 160 may obtain or download applications (e.g., app 110).

Figure 2A:
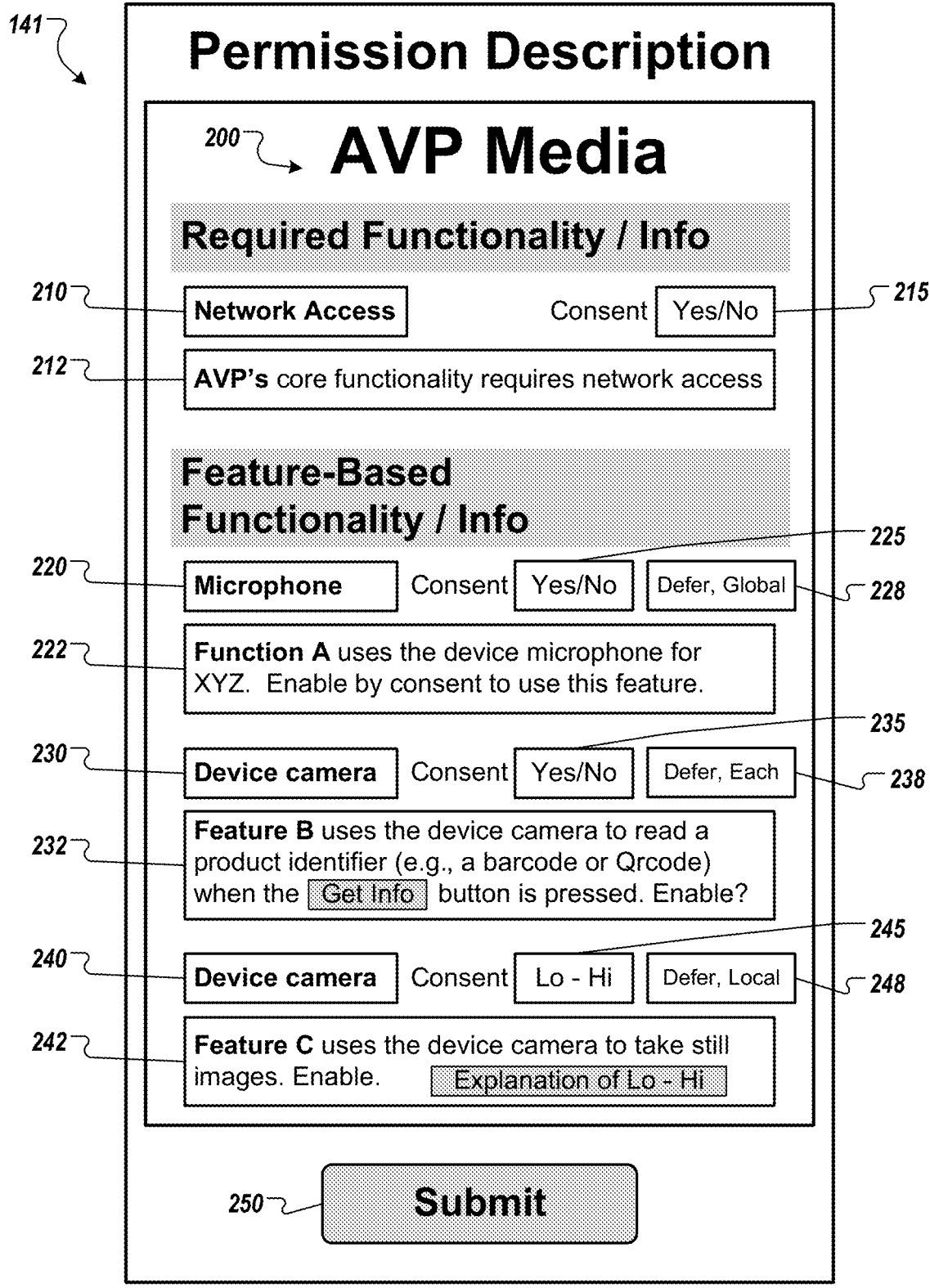
FIG. 2A shows an example user interface for submission of applications.

An example process of releasing an application (e.g., application 120) to app provider 130 may include the app developer 110 issuing a request (e.g., via a website of app provider 130) to submit the application to app provider 130. App developer 110 may be registered as a user to app provider 130 before submitting application 120. App provider 130 may provide a user interface (UI) 140 for app developer 110 to provide information 142-146. An example of UI 140 is shown in FIG. 2A. Information 142 may include one or more fields (e.g., "First name," "Camera," etc.), a description of the fields, and/or what the information or feature identified by the fields are intended to be used by the application 120. Information 144 may describe or identify the permissions or consents sought or requested.

Information 146 is optional information that may identify functions of application 120 that use the information or features associated with information 142 and 144. In some implementations, information 146 is included in app 120 and no need to provide in UI 140. For example, a function that turns on a camera (e.g., a front camera, back camera, or another camera) can be implemented to check that a permission to use the camera has been obtained. If not, depending on the implementation, the function calls another function to obtain the permission.

In some implementations, although not shown in FIG. 1A, information 142-146 may be provided along with app 120 without using UI 140. For example, information 142-146 may be provided as part of app 120 or in a separate file (e.g., configuration file, manifest file, etc.). Information 142-146 may also be gathered (e.g., to embed in app 120 or in a file) using a UI such as UI 140.

In some implementations, although not shown in FIG. 1A, app 120 may be provided by app developer 110 directly to app user 160 without using any intermediary. For example, app user 160 may download app 120 from a website of app developer 110.

App 120 may be provided or distributed as a package, such as an application package file (APK). An APK for app 120 may include executable code, library (optional), and manifest file (optional).

FIG. 2A shows an example user interface for submission of applications. When app developer 110 requests to submit application 120, UI 141 may be used by app developer 110 to enter or provide information 210-248, for example, based on functions of application 120. UI 141, which is a variant of UI 140, shows an example where information 146 (information that links the functions of an application with the permissions sought) is not entered, such as in implementations where the information is built in in the code (e.g., functions check for proper permissions before executing) or provided separately.

An application may include one or two groups of permissions or consents associated with information access or used by the application and functionality provided by the application. One group may be labeled as required functionality and/or information (RFI). Another group may be labeled as feature-based functionality and/or information (FBFI). App developer 110 and/or app provider 130 may classify information and features (e.g., features of a host device) accessed or used by an app to be RFI or FBFI.

An application (e.g., app 120) may include zero, one, or more functions that the developer (e.g., developer 110) and/or app provider consider as core or required functionality. Information and/or features that are used or accessed by the core or required functionality of an app are considered RFI. For example, if an app is an email application, email communication would be considered required functionality. To perform email communication, the app must use networking capability or feature of a host device and the email address of the user of the app. An app developer and/or app provider would identify the networking feature of a host device as well as the user's email address to be included in the RFI. User permission or permissions would be obtained for the RFI group. Permissions may be obtained collectively (e.g., one permission for the RFI group), individually (e.g., one permission for each piece of required information and/or host device feature), or in any combination.

An application may include zero, one, or more non-required functions that the developer (e.g., developer 110) and/or app provider identify to be tied or associated with features of a host device (feature-based functions). For example, if an app is an image or video editing application that can access images or videos from the storage of a host device, the app does not need to use any camera or microphone of a host device, and the host device does not need to have those features (i.e., camera and microphone). If the app also includes a function to allow users to acquire images and/or videos using a host device's camera and microphone, if so equipped, that function would be considered feature based function and the camera and microphone listed in the FBFI group. Similarly, if the app also allows user to send and/or receive images and/or videos by email, for example, the email communication would be considered feature-based function. Networking capability or feature of a host device and the email address of the user of the app would be listed in the FBFI group. Before a feature-based function can be used (e.g., activated), associated user permission or permissions would be obtained in the FBFI group. Permissions may be obtained collectively (e.g., one permission for one or more functions), individually (e.g., one permission for each piece of required information and/or host device feature), or in any combination.

In this example, app developer 110 may consider field 210 to be associated with a required function of app 120 or information required by app 120. For example, application 120 is an application for which one of its core functions may use a host device's network accessing feature (e.g., Wi-Fi, field 210) for the purpose described in description 212. Permission or consent to use the host device's network accessing feature (field 210) may be of a "Yes/No" type 215 (e.g., the user indicates either a "Yes" to allowing app 120 to use the host device's network accessing feature according to the description 212 or "No" to withhold consent). In some implementations, if the user withholds consent to a core function, the user would not be allowed to use the app.

Fields 220, 230, and 240 are, for example, associated with the feature-based functions of and/or information used by application 120. Consent or permission associated with field 220 (e.g., a microphone of the host device) and description 222 may be of the "Yes/No" type 225. Box 228 ("Defer, Global") indicates that giving the consent can be deferred by the user. Once the consent is given, it will be stored "globally," meaning the consent will be available to the same application running on another device. Consent to use a host device's camera (e.g., field 230 and description 232) is also of the "Yes/No" type 235, which can also be deferred as indicated by box 238 ("Defer, Each"). "Defer, Each" means, for example, the user will be prompted each time the associated function is to be executed. This implies that the consent is not stored for later reference.

Field 240 illustrates that more than one permission may be obtained for a feature (e.g., a device camera), based on its use. Field 240 and description 242 show that the same "Device camera" feature of a host device listed in field 230 may be used by two functions of app 120—one to read a product identifier (description 232) and one to take still images (description 242). Consent type 245 shows that it is a scale from low to high ("Lo-Hi"). The "Lo-Hi" scale can be implemented to mean anything (e.g., from low resolution to high resolution of the camera, from low usage to high usage, etc.). Box 248 ("Defer, Local") indicates that giving the consent can be deferred by the user. Once the consent is given, it will be stored "locally," meaning the consent will be available only to the same application running on the same host device, and will not be available to the same application running on another device.

Consent types 215, 224, 235, and 245 may be selection lists. For example, app developer may select from a list of different types of consents that include the "Yes/No" and "Lo-Hi" types, among other types. Similarly, boxes 228, 238, and 248 may be selection lists that include the "Defer, Global," "Defer, Each," "Defer, Local" options, among other options.

In some implementations, there may be other types of consents or permissions, such as per-use permissions, conditional permissions, time-based permissions, etc. For example, options for boxes 228, 238, and 248 may include a per-user consent (not shown), which means the user of application 120 may be asked for permission again each time a certain event occurs (e.g., each time the user's full name is shared with another new user). Another option may be a conditional permission (not shown), which means the consent is valid only if one or more conditions are met. Another option may include a time-based permission, which means the permission is only valid within one or more time periods. One or more of the time periods may be defined by the app developer 110 or user of application 120.

The labels of fields 210, 220, 230, and 240 may refer to atomic information, subcategory of information, and/or category of information. As used herein, the term "atomic information" refers to a piece of information (including information of a feature) that is in the smallest form based on use by an application. For example, a person's name (e.g., a field labeled "name") may be atomic information if an application that uses and/or generates (collectively referred to as "uses") the name field uses it as a whole and does not break down the name into parts, such as first name and last name (i.e., this application does not use just a first name or a last name of the name). In another application that may use a first name and/or a last name of a user, the "name" field, with respect to that application, may be a subcategory of information or a category of information because a name includes a first name and a last name that may be used separately.

The atomic information in some fields (e.g., the fields labeled "network access" and "camera," etc.) may be defined by the description of the fields (e.g., description 212, 222, and/or 232). For example, a camera of a device has many uses (e.g., capture images for storage, detecting light, capturing text, capturing codes, etc.). The description 232 describes a limited use (e.g., "to read a product identifier") and/or a use under a condition (e.g., "when the 'Get Info' button is pressed") for the field of "Device camera" 230. The description 232 defines the field 230 as atomic information or subcategory of information.

When the user of UI 141 (e.g., app developer 110) presses the submit button 250 or the like, identification of one or more permissions (e.g., 215, 225, 235, and 245) and information associated with the one or more permissions (e.g., 210, 212, 220, 222, 230, 232, 240, and 242) is sent to app provider 130 as metadata 150, FIG. 1A or a variation of metadata 150 (e.g., without information 146). Metadata 150 is data of or about information 142, 144, and 146 (optional, depending on implementations). App developer 110 may use UI 140 to provide updated information 142-146 or use UI 141 to provide updated information 142-144 (where 142 is referred to as 210, 220, 230, and 240 and 144 is referred to as 212, 222, 232, and 242). For example, a different version of application 120 may need one or more new consents. App developer app developer 110, when requests to upload the new version of application 120, may provide the updated information 142-146 associated with the new version of application 120.

Referring back to FIG. 1A, UI 140 (or UI 141, FIG. 2A) sends information metadata 150 to app provider 130. If application 120 has not been sent or uploaded to app provider 130, it may be done so at this time or at any time (e.g., before, at, or after metadata 150 is sent to app provider 130). App provider 130 stores the application 120 and associated metadata 150, which may include a separate manifest file that includes information 146. In some implementations, app 120 and metadata 150 may be provided to app provider 130 in a package (e.g., an APK package).

App provider 130 may be a service provider that provides one or more applications to users for a fee or no fee. If fees are collected (e.g., for application 120) a portion or all of the collected fees may be provided to the developers (e.g., app developer 110). When a prospective user or an existing user (referred here as app user 160) requests to view or download application 120 (e.g., for installing on device 162), app provider 130 provides metadata 150 to device 162 for presenting to app user 160. Device 162 can be any type of device, such as a mobile device (shown), a laptop (not shown), a desktop device (not shown), a device built into another device or vehicle (not shown).

Device 162 may present metadata 150 in a UI 165. UI 165 is described further in FIG. 2B below. Consent or permission information (e.g., consent types 215, 225, 235, and 245, FIG. 2A) may be presented using widgets 170 (e.g., check a "Y" box to provide a permission) and 172 (e.g., check "D" box to defer giving a permission) for app user 160 to provide or enter his or her choices. Device 162 may not need to provide consents to all information described in metadata 150. When one or more consents are given by device 162 (e.g., checking the check boxes 170), the consents and/or deferment information 175 are transmitted or sent to app provider 130. App provider 130 determines that all the necessary consents (e.g., for the required functions) are received from 162 then provides application 120 to device 162 (e.g., for installation). After installation of app 120, device 162 becomes host device, a device on which application 120 is executed.

In some implementations, application 120 may be provided to device 162 along with metadata 150, separately or together (e.g., in an APK package). Metadata 150 may indicate the necessary consents for the required functions and/or feature-based functions. Device 162 may determine that the necessary consents the required functions, if any, are entered by app user 160 before installing application 120. In some implementations, application 120 may provide functionalities based on the given consents. For example, one or more functions of application 120 may be enabled or disabled based on the present or absent of consents associated with the functions.

In some implementations, app provider 130 may include a database 155 that stores information that indicates which applications and which versions of the applications have been provided to which users and/or which devices. Database 155 may include which consents have been given by which users for which devices, features list of devices, etc. Information stored in database 155 may be used to determine that some installations are subsequent installations, installation in additional devices, or update installations (collectively referred to as "subsequent installations"). In subsequent installations, app provider 130 may provide a subset of the metadata 150 based on or catered to a subsequent installation.

For example, database 155 may indicate that device 162 is a second device of app user 160, who has previously installed application 120 to another device (not shown). Device 162 has a new feature (e.g., additional processor, a different processor, a camera, a second or third camera, a new capability, such as communication capability, etc.) that another device with the previous installation does not have. Since the another device does not have, for example, a camera, when metadata 150 was sent to the another device, the field of "Device camera" 230 and corresponding description 232 and consent type 235 were not sent to the another device and were not presented to app user 160 to request his or her consent to using the camera of the another device, because it does not have a camera.

However, when a subsequent installation request is received by app provider 130, which may receive indication of an camera or determine that device 162 has a built-in camera, metadata 150 sent to device 162 includes the field of "Device camera" 230 and corresponding description 232 and consent type 235. If consent to the use of the camera is necessary in a required or feature-based function, the consent is obtained and returned (e.g., in consents 175) to app provider 130 before application 120 can be installed on device 162, granting application 120 to use the built-in camera of device 162 for the purpose described in 232.

In some implementations, some or all of consents and/or deferment information 175 may not be returned or sent to app provider 130, or a copy of information 175 is sent to app provider 130 and also kept in device 162. For example, app provider 130 may provide app 120 and metadata 150 to device 162 to allow device 162 to manage consents locally and store any consents given by the user locally in device 162.

Figure 2B:
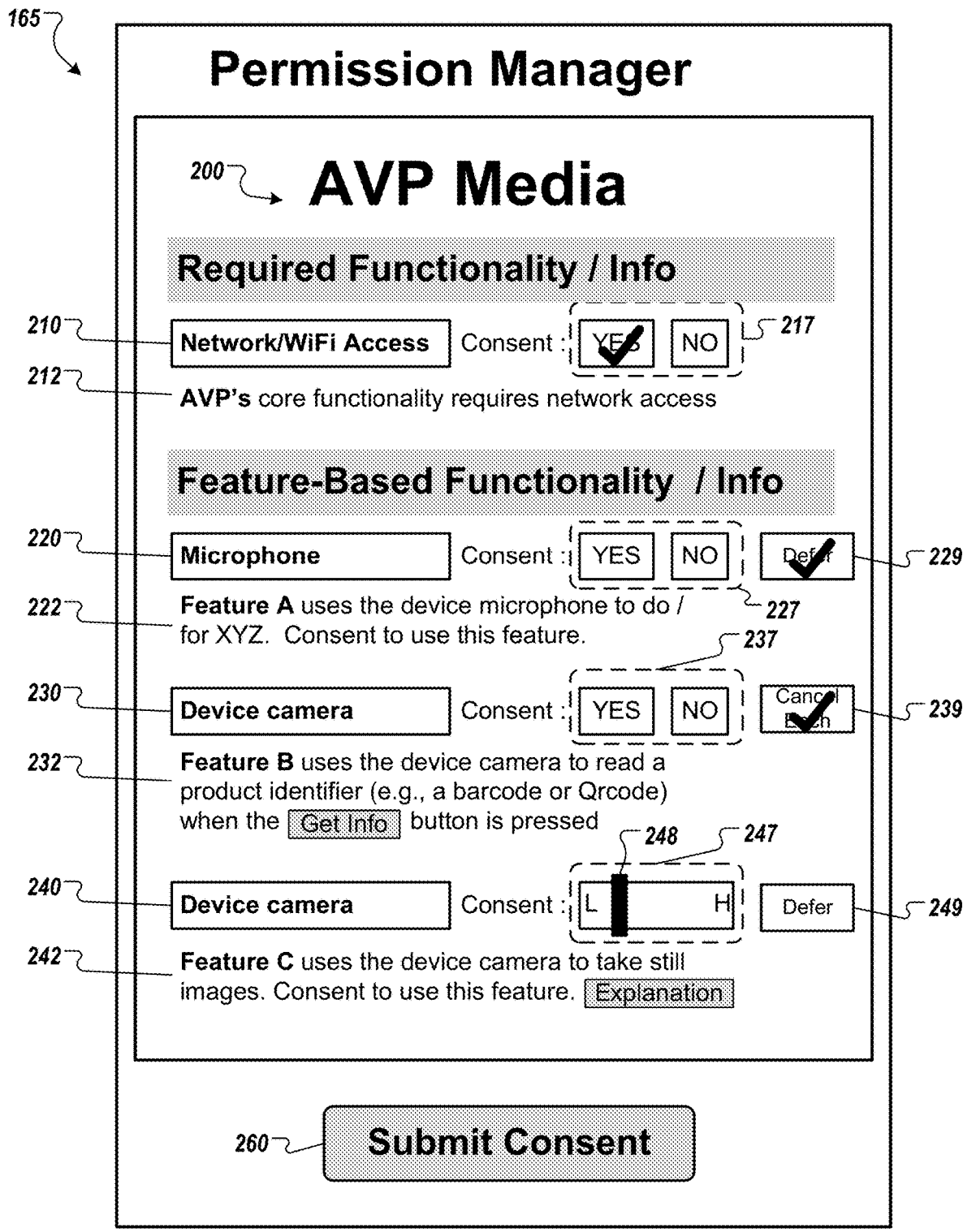
FIG. 2B shows an example user interface for providing consents to an application.

FIG. 2B shows an example user interface for providing consents to an application. Example UI 165 provides metadata 150 as information associated with the one or more permissions (e.g., fields 210, 220, 230, and 230 and description 212, 222, 232, and 242). Widgets 170 may be shown as user controls 217, 227, 237, and 247 for app user 160 to provide input by selecting a "Yes" box or a "No" box instead of checking a box or not checking the box. Widget 172 may be shown as user controls 229, 239, and 249 to allow user 160 a choice to defer giving a permission or consent. For example, in an implementation, selecting the "Yes" box 227 means the user is given the consent. Selecting the "No" box 227 means the user is withholding the consent, and, depending on implementation, the application may or may not ask for the consent the next time an associated function is be executed (i.e., the function is disabled if the application does not try to obtain the consent for execution). Selecting neither the "Yes" nor "No" boxes 227 would mean, in one implementation, deferment of the consent. In some implementations, the user would need to select the "Defer" box 229 to indicate the user's desire to defer giving the consent, as shown here.

Recall box 238 ("Defer, Each") above, which means, for example, the user will be prompted each time the associated function is to be executed. In some implementations, the user may be allowed to change it from an "each use" consent to a "one time" consent by checking the "Cancel Each" box 239, which will squelch future notifications for providing the consent. The user may give a consent now by checking the "Yes" box 237 or defer giving the consent by not checking the "Yes" box 237.

In user control 247, for example, the user may select to provide a consent by placing or setting a bar 248 to indicate the level of consent given. Since the consent to 240 is given, the "Defer" box 249 is disregard, which means the user will not be prompted for a consent go 240 in the future, unless something is changed.

In some implementations, user controls 229, 239, and 249 are not provided and deferment is implied if the user selects neither the "Yes" box nor the "No" box in user control 227, 237, or 247.

When user control 260 is pressed, consents 175, which include information provided with user controls 217, 227, 229, 237, 239, 247, and 249, are sent to app provider 130. After installation of application 120, app user 160 may use UI 165 to manage consents (e.g., withhold a consent previously given and/or given a new consent). The updated consents 175, when received by app provider 130, are provided to device 162 to configure application 120 accordingly. For example, the withheld consent (e.g., selecting "No" in 227 or 237) may disable a function that requires the consent to operate or disable application 120 if the withheld consent (e.g., selecting "No" in 217) is a necessary consent. The newly given consent may enable function that requires the consent to operate.

Figure 1B:
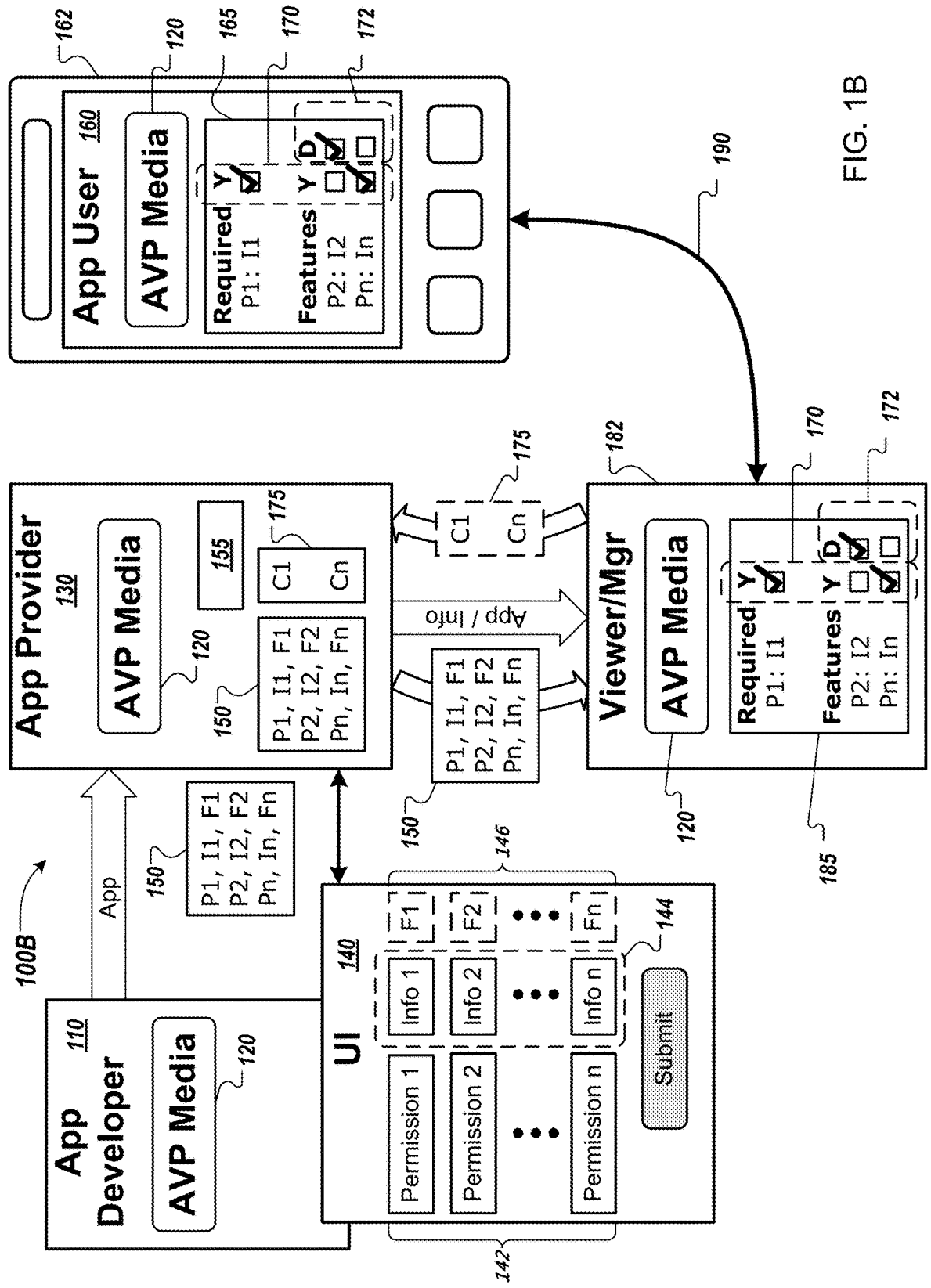
FIG. 1B shows another example environment where an application may be provided according to some example implementations.

FIG. 1B shows another example environment where an application may be provided according to some example implementations. In some implementations, a user (e.g., app user 160) or potential user may use another device 182 (e.g., a device that application 120 is not intended to be executed on, such as a laptop device or another device) to view information about application 120, provide consents for device application 120, and/or store application 120 for installing on device 162 through, for example, a link or path 190. When a request for application 120 or information about application 120 is received by app provider 130 from device 182, metadata 150 may be provided. Application 120 may also be provided to device 182, depending on implementations. If device 182 is implemented to allow user 160 to provide consents, UI 185 (e.g., similar to UI 165) may be presented with metadata 150. Likewise, widgets 170 and 172 may be provided to allow app user 160 to enter consents and/or deferment information 175, which may be sent to app provider 130 and/or stored in device 182. Before providing metadata 150 to device 182, information describing device 162 or another device, on which application 120 is intended to be installed, may be requested by and/or provided to app provider app provider 130, so that the appropriate set of metadata 150 may be provided to device 182 (e.g., providing information about a device camera to app provider 130 so that the associated metadata 150 is provided to device 182 to obtain consent to use the device camera if the device intended to install application 120 has a camera).

Figure 3:
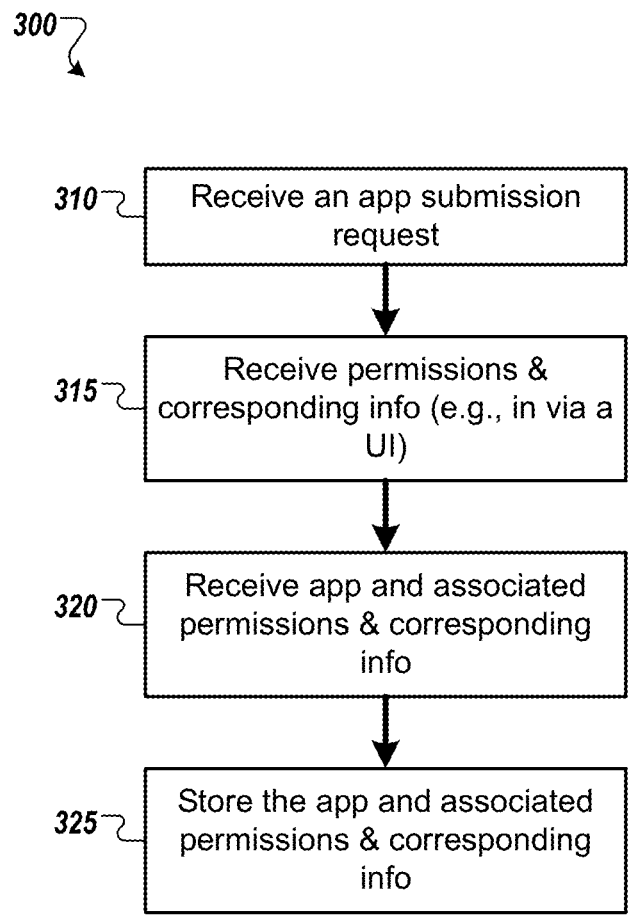
FIG. 3 shows an example process implementation for uploading an application.

FIG. 3 shows an example process implementation for uploading an application. Process 300 includes, for example, blocks 310-325. At block 310, a request to submit an application (e.g., application 120) is received from a user (e.g., app developer 110). The request may be any trigger to ask app developer 110 to provide information 142-144, FIG. 1A, or 210-248, FIG. 2A. In some implementations, app developer 110 does not need to make any explicit request and/or app provider 130 does not need to provide any mechanism (e.g., UI 140) to gather the information 142-144. App developer 110 may simply submit or upload application 120 and information 142-144 to app provider 130.

In other implementations, as described herein, app provider 130, at block 315, may provide UI 140 to gather or request from app developer 110 identification of one or more permissions and information associated with the permissions (e.g., information 142-144, FIG. 1A, or 210-248, FIG. 2A). At block 320, app provider 130 receives the application, the one or more permissions, and the information associated with the permissions. In some implementations, application 120 may be sent or uploaded to app provider 130 separately from the information 142-144. Information 146 may be provided with app 120, in a separate file, or using UI 140.

One or more permissions may be associated with one or more functions of the application 120. If a function is a required function (e.g., no option to disable or not use the function), then a permission or consent to operate that function is necessary. If the necessary consent is not given by a user (e.g., app user 160), application 120 may not be available to download, not be allowed to be installed, or not be allowed to be executed until the necessary consent is given. If a function is not a required function (e.g., the function may be enabled or disabled), the present or absent of a permission or consent to operate that function renders the function available (enabled) or not available (disabled), respectively.

At block 325, app provider 130 may store the application, the one or more permissions, and the information associated with the one or more permissions. In some implementations, app provider 130 may manage application 120 without storing the application. For example, when all necessary consents are received, app provider 130 may indicates to app developer 110 or another party (not shown) to provide application 120 to app user 160.

In some examples, process 300 may be implemented with different, fewer, or more blocks. Process 300 may be implemented as computer executable instructions, which can be stored on a medium (e.g., non-transitory computer readable medium), loaded onto one or more processors of one or more computing devices, and executed as a computer-implemented method.

Figure 4:
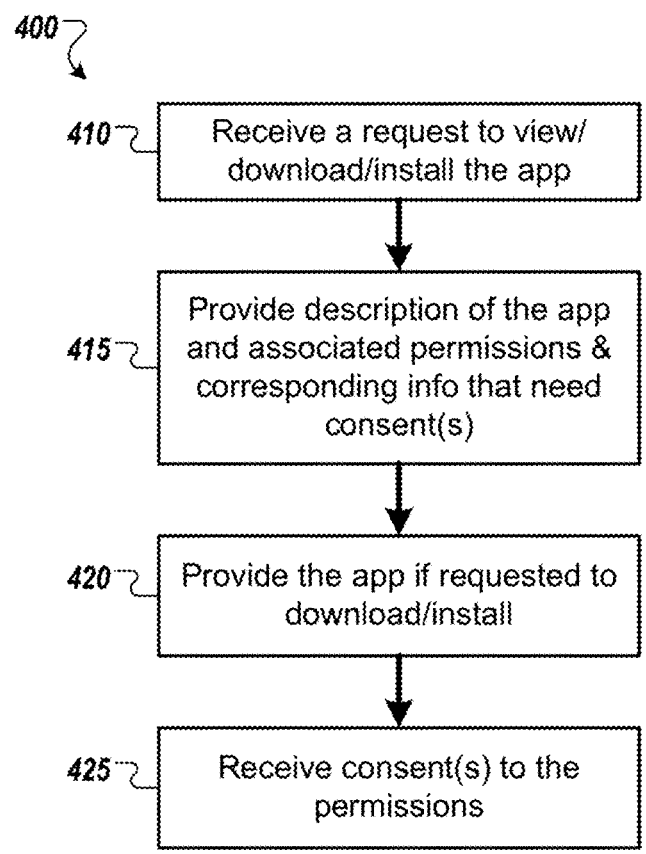
FIG. 4 shows an example process implementation for downloading an application.

FIG. 4 shows an example process implementation for downloading an application. Process 400 includes, for example, blocks 410-425. At block 410, a request to view, download, or install an application (e.g., application 120) is received by, for example, app provider 130. The request is from a user other than app developer 110. The request may be from, for example, device 162 or device 182, as described in FIG. 1A or 1B. At block 425, the one or more permissions, and the information associated with the one or more permissions are provided to the requesting device. At block 420, the application (e.g., application 120) may be provided. In some implementations, the application may be provided at block 415. At block 425, one or more consents to the one or more permissions are received. In some implementations, the application is not provided until the consents to use the application are received. The consents, if necessary, are provided to operate or use the application. If one or more consents are not necessary consents, but are needed to active or enable certain functionality or functions of the application, the presence of these consents turn on, activate, or otherwise enable the associated functions. The absence of these consents turn off, deactivated, or otherwise disable the associated functions.

In some examples, process 400 may be implemented with different, fewer, or more blocks. Process 400 may be implemented as computer executable instructions, which can be stored on a medium (e.g., non-transitory computer readable medium), loaded onto one or more processors of one or more computing devices, and executed as a computer-implemented method.

Figure 5:
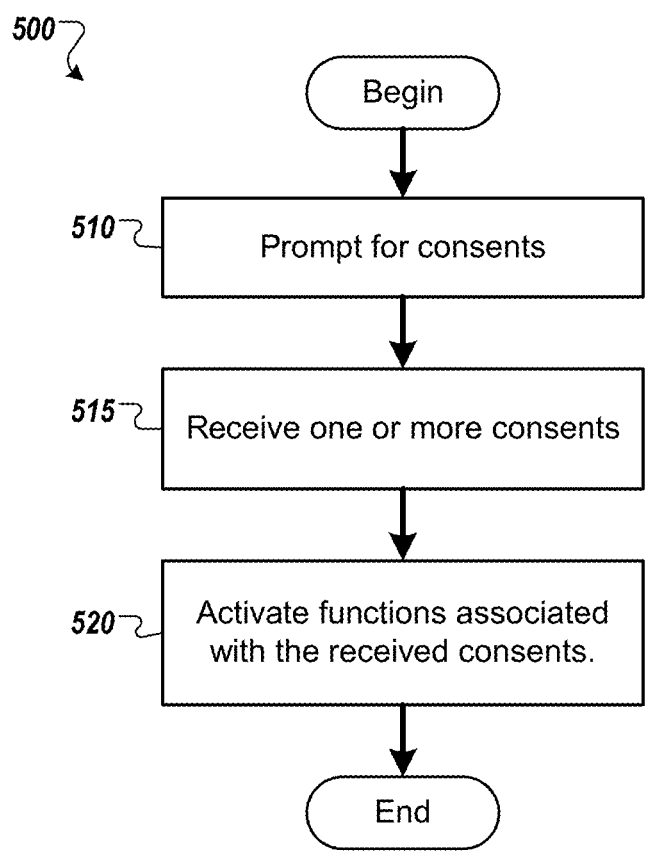
FIG. 5 shows an example process implementation for managing consents.

FIG. 5 shows an example process implementation for managing consents. Process 500 includes, for example, blocks 510-520. At block 510, prompt a user to provide one or more consents associated with one or more functions of an application. The prompting may be implemented as described above in UI 165 in FIGS. 1A and 2B or implemented differently. In some implementations, an application does not allow using the functions without the associated consents. Obtaining consents may be initiated by, for example, a consent manager module in the application, is the operating system of the host device (e.g., device 182) or another device (e.g., device 182). At block 510, one or more consents are received from a user (e.g., by the consent manager). At block 520, the functions associated with the received consents are activated or otherwise enable to be executed to allow the user to use services provided by the functions.

In some examples, process 500 may be implemented with different, fewer, or more blocks. Process 500 may be implemented as computer executable instructions, which can be stored on a medium (e.g., non-transitory computer readable medium), loaded onto one or more processors of one or more computing devices, and executed as a computer-implemented method.

Figure 6A:
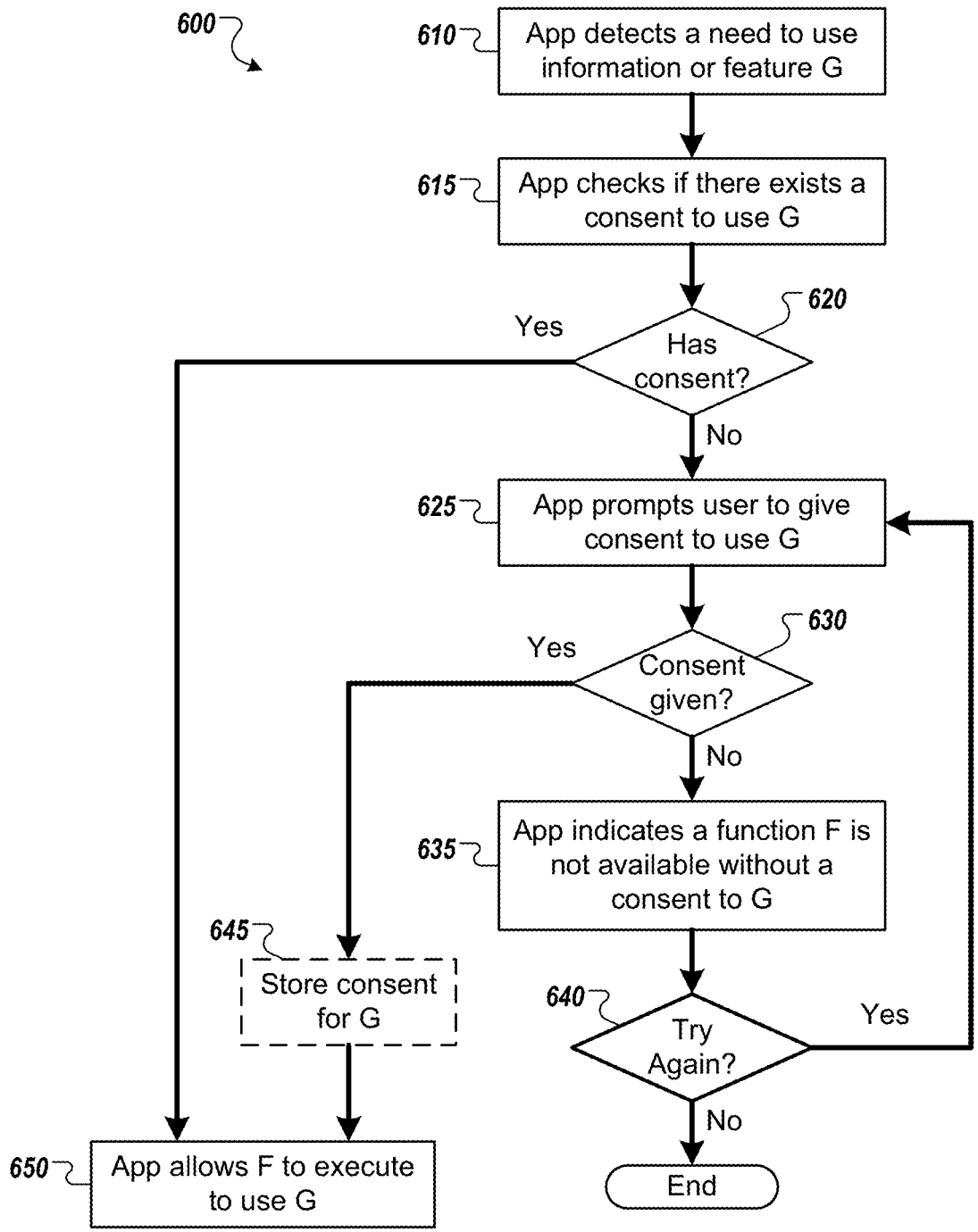
FIG. 6A shows an example process implementation for acquiring additional consents.

FIG. 6A shows an example process implementation for acquiring additional consents. Process 600 includes, for example, blocks 610-650. At block 610, an executing application detects or determines a need to use a function F, which needs to use information of the user or a feature or the host device G. At block 615, the application checks to see if a consent to access or use G has been given. If the check at 620 is positive, the function F is activated, enabled, or otherwise allowed to be executed, which uses G, at 650. If the check at 620 is negative, the app prompts the user to provide consent to use G at 625. If the consent is given, at 630, the consent, at 645, is recorded or stored in the application, the host device, or another location (e.g., at app distributor 130 so that the user does not have to give the same consent if the user uses the app on another host device). Then the process 600 flows to block 650. If the consent is not given, at 630, the app displays a message indicating that a function F (e.g., a function of taking photos or videos) is not available without a consent to use G (e.g., a camera of the host device). Decision block 640 loops back to block 625 if the app determines that it should try to obtain the consent again (e.g., the user presses a button or widget that indicates the user wants to try again or having similar effect). If the app determines that it should not try again (e.g., the user presses a button or widget that indicates "Cancel," "Exit," or having similar effect), process 600 ends.

In some examples, process 600 may be implemented with different, fewer, or more blocks. Process 600 may be implemented as computer executable instructions, which can be stored on a medium (e.g., non-transitory computer readable medium), loaded onto one or more processors of one or more computing devices, and executed as a computer-implemented method.

Figure 6B:
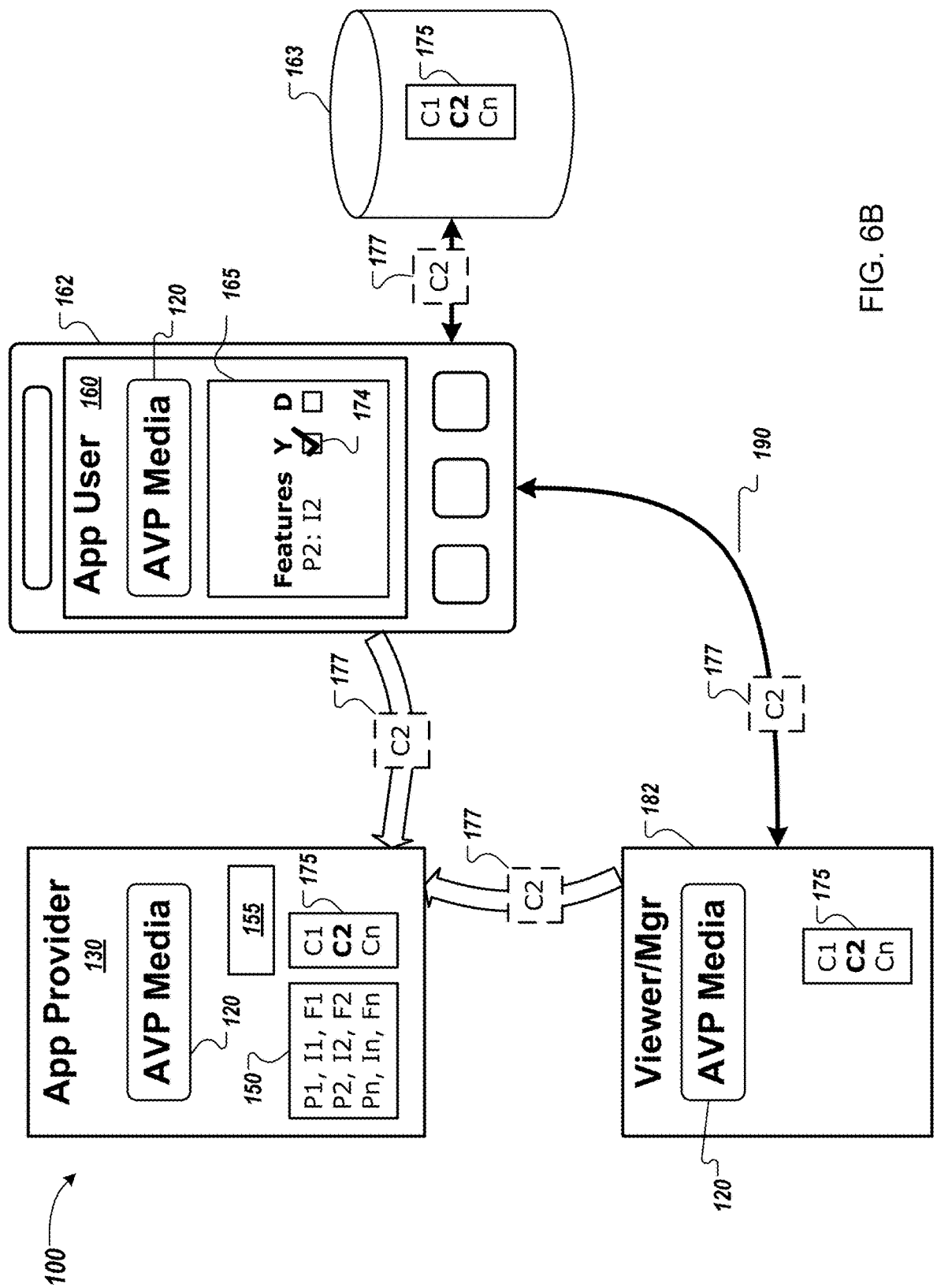
FIG. 6B shows an example environment where consents are managed.

FIG. 6B shows an example environment where consents are managed. For example, as described in block 610 above, when application 120 detects or determines a need to use a function F, which needs to use information of the user or a feature or the host device G (shown as "P2" and "I2"), app 120 prompt (e.g., using UI 165) the user to enter a consent 174. The consent (shown as "C2"), if given, may be stored with information 175 locally at a storage 163 associated with device 162 (e.g., inside device 162) or transmitted as information 177 to device 182 to store there. In some implementations, the additional consent "C2" may be transmitted to app provider 130 from device 162 or 182 for storage.

Figure 7:
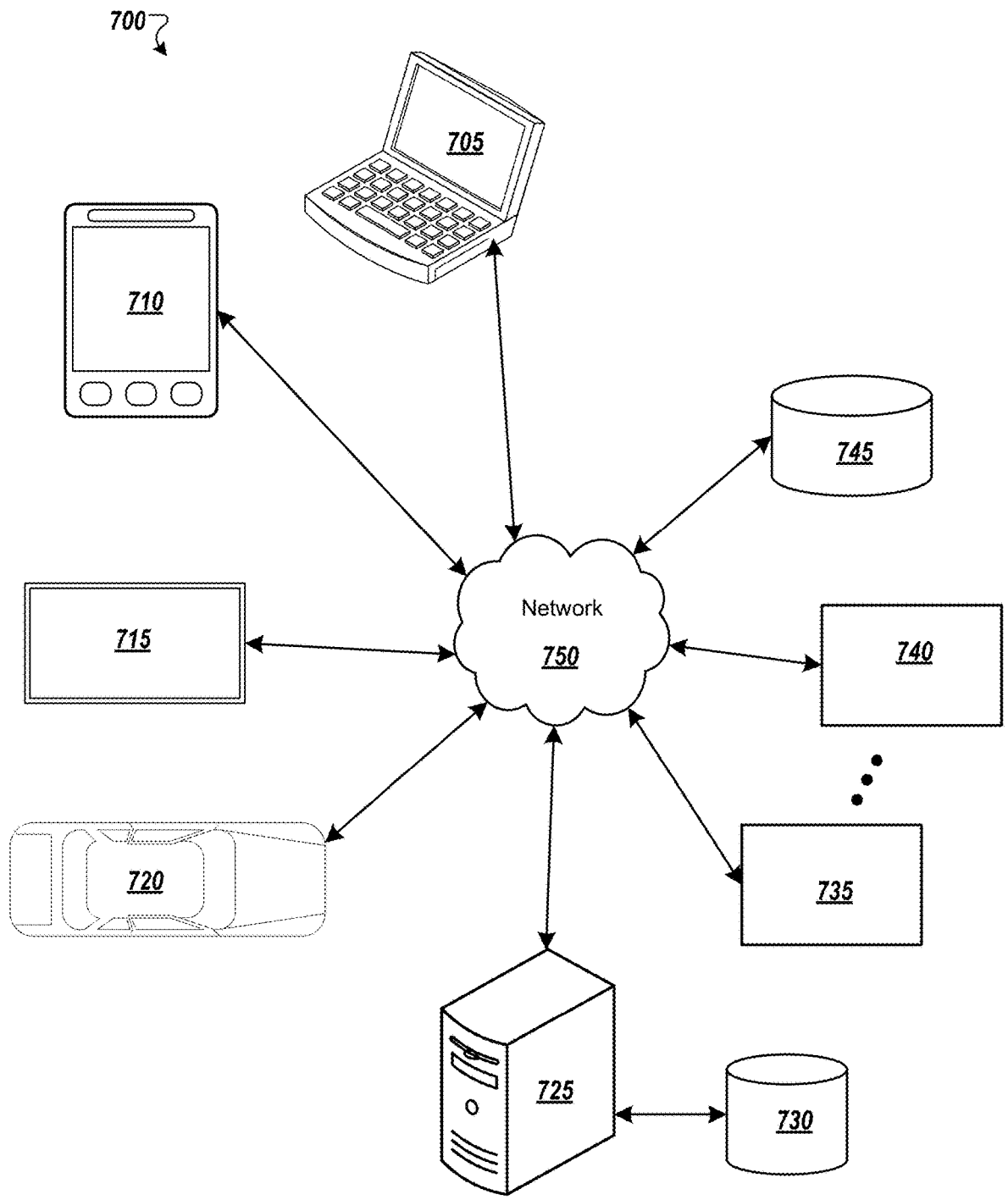
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing device 805 described below in FIG. 8. Devices 705-745 may include, but are not limited to, a computer 705 (e.g., a laptop computing device), a mobile device 710 (e.g., smartphone or tablet), a television 715, a device associated with a vehicle 720, a server computer 725, computing devices 735-740, storage devices 730 and 745.

In some implementations, devices 705-720 may be considered user devices (e.g., devices used by app developer 110 and/or app user 160. Devices 725-745 may be devices associated with service providers (e.g., used by service providers to provide services, provide applications, and/or store applications and data, such as application 120, metadata 150, records 155, consents 175, etc.). Devices 725-745 may be used by app developer 110 and/or app provider 130.

For example, device 710 may be device 162 in FIG. 1A. A user (e.g., app user 160) may use device 710 to request application 120 from app provider 130, using one or more devices 725-745. App provider 130 may provide application 120 to app user 160 on device 710 as described above.

Figure 8:
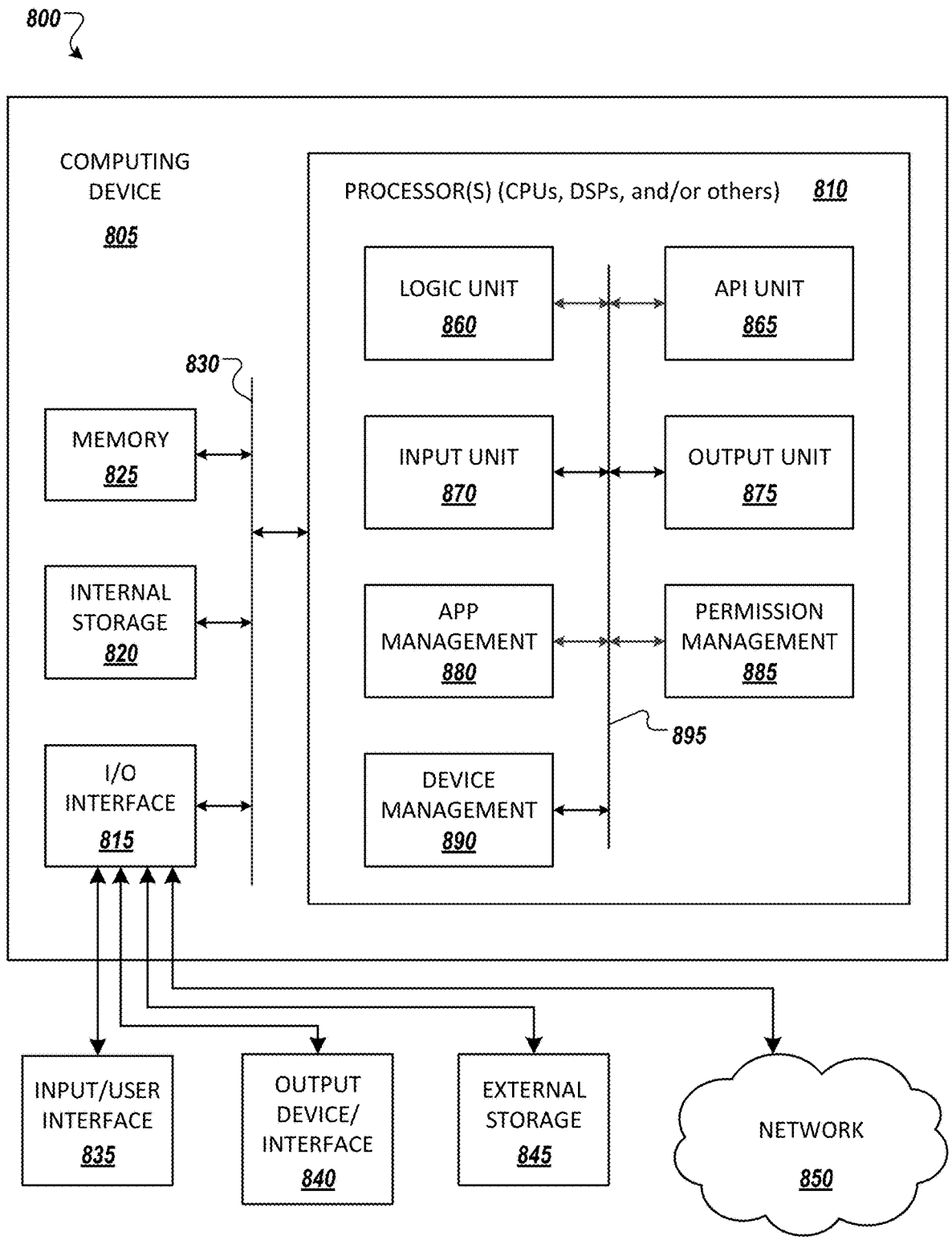
FIG. 8 shows an example computing environment with an example computing device suitable for use in some example implementations.

FIG. 8 shows an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, app management 880, permission management 885, device management 890, and inter-unit communication mechanism 895 for the different units to communicate with each other, with the OS, and with other applications (not shown). For example, app management 880, permission management 885, and device management 890 may implement one or more processes or UI shown and described in FIGS. 1-7. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, app management 880, permission management 885, and device management 890). For example, when app management 880 detects a request to upload an application (e.g., application 120) from information receive through input unit 870, permission management 885 is called by API unit 665 to provide UI 140 to gather metadata 150. When device management 890 receives a request to view, download, or install application 120 through input unit 870, device management 890, though output 875, provides information about application 120 and metadata 150. Device management 890 may wait for consents 175 to be received before providing application 120 device. In some implementations, device management 890 may determine that consents 175 are all the necessary consents before providing application 120 to the requesting device.

In some instances, logic unit 860 may be configured to control the information flow among the units and direct the services provided by API unit 865, input unit 870, output unit 875, app management 880, permission management 885, and device management 890 in some example implementations described above. For example, the flow of one or more processes or implementations may be controlled by logic unit 860 alone or in conjunction with API unit 865.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method when executed by data processing hardware causes the data processing hardware to perform operations comprising:
    executing an application on a user device, the application comprising a feature based function requiring access to a feature resource of the user device when the application uses the feature based function;
    during execution of the application on the user device, determining that the application requires use of the feature based function;
    based on determining that the application requires use of the feature based function, requesting permission for the application to access the feature resource of the user device to use the feature based function, the permission request comprising a usage description of the feature resource by the feature based function, the usage description comprising at least one of a use for accessing the feature resource or a condition under which the feature resource is accessed;
    in response to determining that the permission for the application to access the feature resource of the user device is granted by a user of the user device, allowing the application to access to the feature resource of the user device;
    in response to determining that the permission for the application to access the feature resource of the user device is denied by the user, denying the application from accessing the feature resource of the user device; and
    in response to determining that the permission for the application to access the feature resource of the user device is a deferred permission designated by the user, not storing the permission for the application for a future access of the feature resource, wherein the deferred permission requires the feature resource to be requested a next time a function of the application attempts to access the feature resource.

2. The computer-implemented method of claim 1, wherein the application further comprises a required application function requiring access to a required resource of the user device, the application having been granted permission to access the required resource of the user device at installation of the application on the user device.

3. The computer-implemented method of claim 1, wherein the application further comprises an optional application function requiring access to an optional resource of the user device, the application having been deferred permission to access the optional resource of the user device.

4. The computer-implemented method of claim 1, wherein the application further comprises a second optional application function requiring access to a second optional resource of the user device, the application having been denied permission to access the second optional resource of the user device.

5. The computer-implemented method of claim 4, wherein the operations further comprise prohibiting the application from requesting permission to access the second optional resource of the user device.

6. The computer-implemented method of claim 1, wherein the operations further comprise determining whether the application has existing permissions to access the feature resource of the user device.

7. The computer-implemented method of claim 1, wherein the feature based function further requires access to information of the user device.

8. The computer-implemented method of claim 1, wherein the feature resource comprises a camera of the user device.

9. The computer-implemented method of claim 1, wherein the feature resource comprises a microphone of the user device.

10. A system comprising:
    data processing hardware; and
    memory hardware in communication with the data processing hardware, the memory hardware storing instructions that when executed on the data processing hardware cause the data processing hardware to perform operations comprising:
        executing an application on a user device, the application comprising a feature based function requiring access to a feature resource of the user device when the application uses the feature based function;

during execution of the application on the user device, determining that the application requires use of the feature based function;

based on determining that the application requires use of the feature based function, requesting permission for the application to access the feature resource of the user device to use the feature based function, the permission request comprising a usage description of the feature resource by the feature based function, the usage description comprising at least one of a use for accessing the feature resource or a condition under which the feature resource is accessed;

in response to determining that the permission for the application to access the feature resource of the user device is granted by a user of the user device, allowing the application to access to the feature resource of the user device;

in response to determining that the permission for the application to access the feature resource of the user device is denied by the user, denying the application from accessing the feature resource of the user device; and in response to determining that the permission for the application to access the feature resource of the user device is a deferred permission designated by the user, not storing the permission for the application for a future access of the feature resource, wherein the deferred permission requires the feature resource to be requested a next time a function of the application attempts to access the feature resource.

11. The system of claim 10, wherein the application further comprises a required application function requiring access to a required resource of the user device, the application having been granted permission to access the required resource of the user device at installation of the application on the user device.

12. The system of claim 10, wherein the application further comprises an optional application function requiring access to an optional resource of the user device, the application having been deferred permission to access the optional resource of the user device.

13. The system of claim 10, wherein the application further comprises a second optional application function requiring access to a second optional resource of the user device, the application having been denied permission to access the second optional resource of the user device.

14. The system of claim 13, wherein the operations further comprise prohibiting the application from requesting permission to access the second optional resource of the user device.

15. The system of claim 10, wherein the operations further comprise determining whether the application has existing permissions to access the feature resource of the user device.

16. The system of claim 10, wherein the feature based function further requires access to information of the user device.

17. The system of claim 10, wherein the feature resource comprises a camera of the user device.

18. The system of claim 10, wherein the feature resource comprises a microphone of the user device.

\* \* \* \* \*